United States Patent
Mecocci et al.

(10) Patent No.: US 12,338,866 B2
(45) Date of Patent: Jun. 24, 2025

(54) BRAKE PAD; PAD ASSEMBLY; BRAKE CALIPER ASSEMBLY

(71) Applicant: Brembo S.p.A., Bergamo (IT)

(72) Inventors: Andrea Mecocci, Bergamo (IT); Stefano Zaghi, Bergamo (IT); Nicolas Minucci, Bergamo (IT); Alberto Pendesini, Bergamo (IT)

(73) Assignee: Brembo S.p.A., Bergamo (IT)

( * ) Notice: Subject to any disclaimer, the term of this patent is extended or adjusted under 35 U.S.C. 154(b) by 374 days.

(21) Appl. No.: 17/930,170

(22) Filed: Sep. 7, 2022

(65) Prior Publication Data

US 2023/0076059 A1     Mar. 9, 2023

(30) Foreign Application Priority Data

Sep. 8, 2021  (IT) ................. 102021000023168

(51) Int. Cl.
| | |
|---|---|
| *F16D 65/092* | (2006.01) |
| *F16D 55/00* | (2006.01) |
| *F16D 65/00* | (2006.01) |
| *F16D 65/095* | (2006.01) |

(52) U.S. Cl.
CPC ......... *F16D 65/0068* (2013.01); *F16D 55/00* (2013.01); *F16D 65/095* (2013.01); *F16D 2055/0016* (2013.01)

(58) Field of Classification Search
CPC .... F16D 65/0068; F16D 55/00; F16D 65/095; F16D 2055/0016
USPC ........... 188/73.1, 73.31, 73.44, 73.45, 73.32, 188/250 B, 250 E, 250 F, 250 G
See application file for complete search history.

(56) References Cited

U.S. PATENT DOCUMENTS

| | | | |
|---|---|---|---|
| 3,322,236 A * | 5/1967 | Burnett ............... | F16D 55/2255 188/73.35 |
| 3,500,967 A | 3/1970 | Nolan | |
| 4,350,229 A * | 9/1982 | Ito ......................... | F16D 55/227 188/73.32 |
| 10,670,093 B2 * | 6/2020 | Dreher .................... | F16D 65/18 |
| 10,690,202 B2 * | 6/2020 | Crippa .................. | F16D 65/095 |
| 2011/0127126 A1 | 6/2011 | Ciotti et al. | |

(Continued)

FOREIGN PATENT DOCUMENTS

EP       3559495 A1       10/2019

OTHER PUBLICATIONS

Italian Patent and Trademark Office, Search Report in Application No. IT202100023168, dated Feb. 17, 2022, 9 pages, Munich.

*Primary Examiner* — Christopher P Schwartz
(74) *Attorney, Agent, or Firm* — Marshall & Melhorn, LLC

(57) ABSTRACT

A brake pad may have at least one plate. The plate may be provided with a first slot. The first slot may have a first slot edge adapted to accommodate a first pin. The first slot edge may have a first portion and a second portion, in which the brake pad has a tangential center-of-gravity plane. The first and second portions may be crossed by the tangential center-of-gravity plane so that under a reverse braking condition the brake pad rests against the first pin in at least a first contact point of the first slot. Under a forward braking condition the brake pad rests against the first pin in at least a second contact point of the first slot in which the second contact point of first slot lies in the tangential center-of-gravity plane.

14 Claims, 13 Drawing Sheets

(56) References Cited

U.S. PATENT DOCUMENTS

| | | |
|---|---|---|
| 2012/0043168 A1 | 2/2012 | Narayanan V et al. |
| 2016/0185323 A1* | 6/2016 | Kaneko .................. F16D 55/226 188/73.1 |
| 2016/0273599 A1 | 9/2016 | Loos et al. |
| 2018/0195569 A1 | 7/2018 | Dreher et al. |
| 2020/0149600 A1 | 5/2020 | Crippa et al. |
| 2021/0231182 A1* | 7/2021 | Dreher .................. F16D 65/095 |

\* cited by examiner

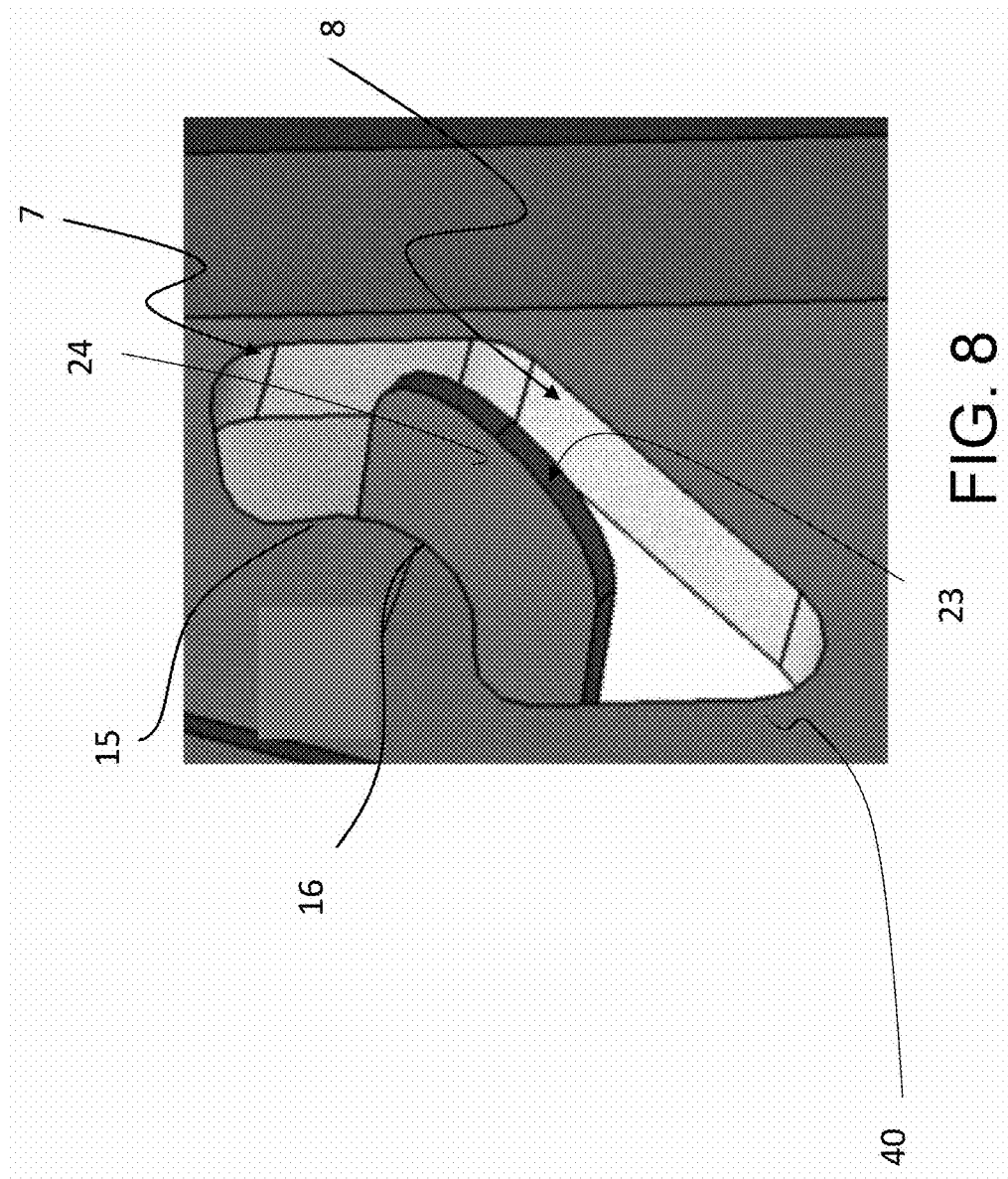

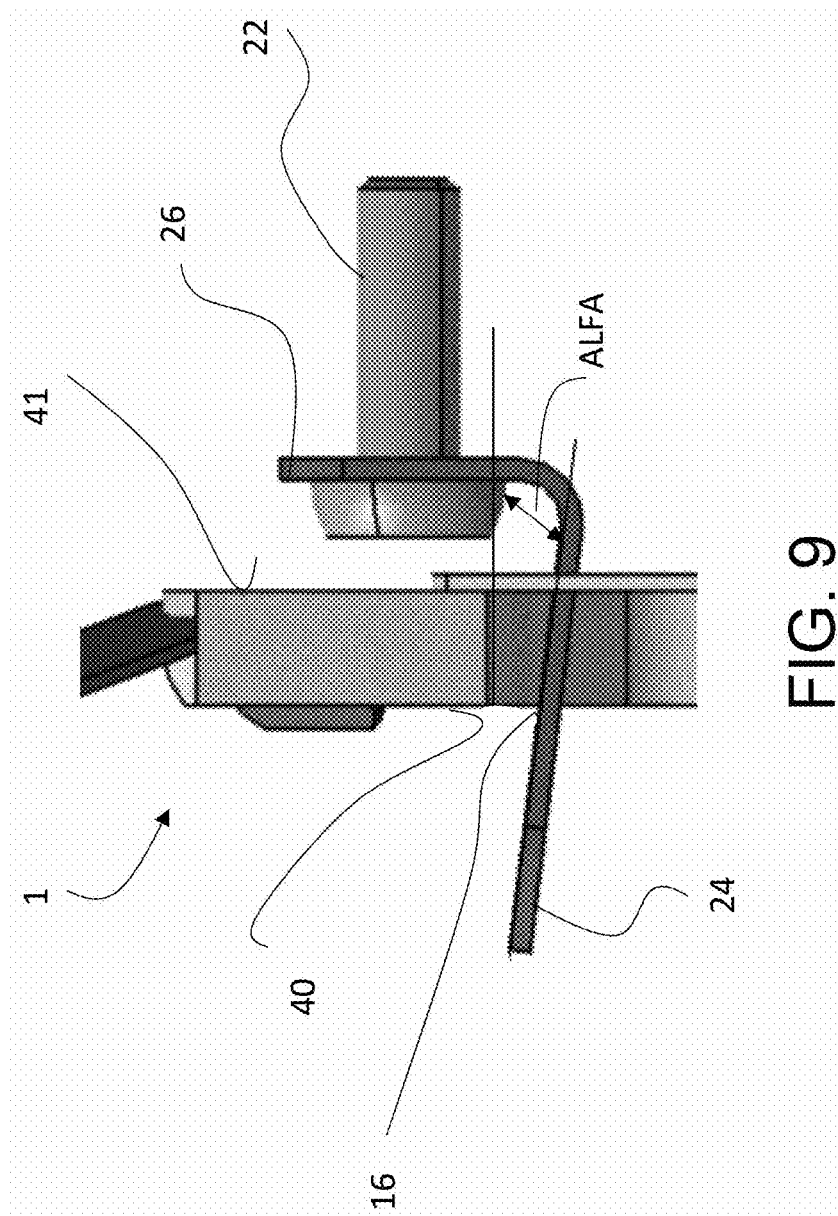

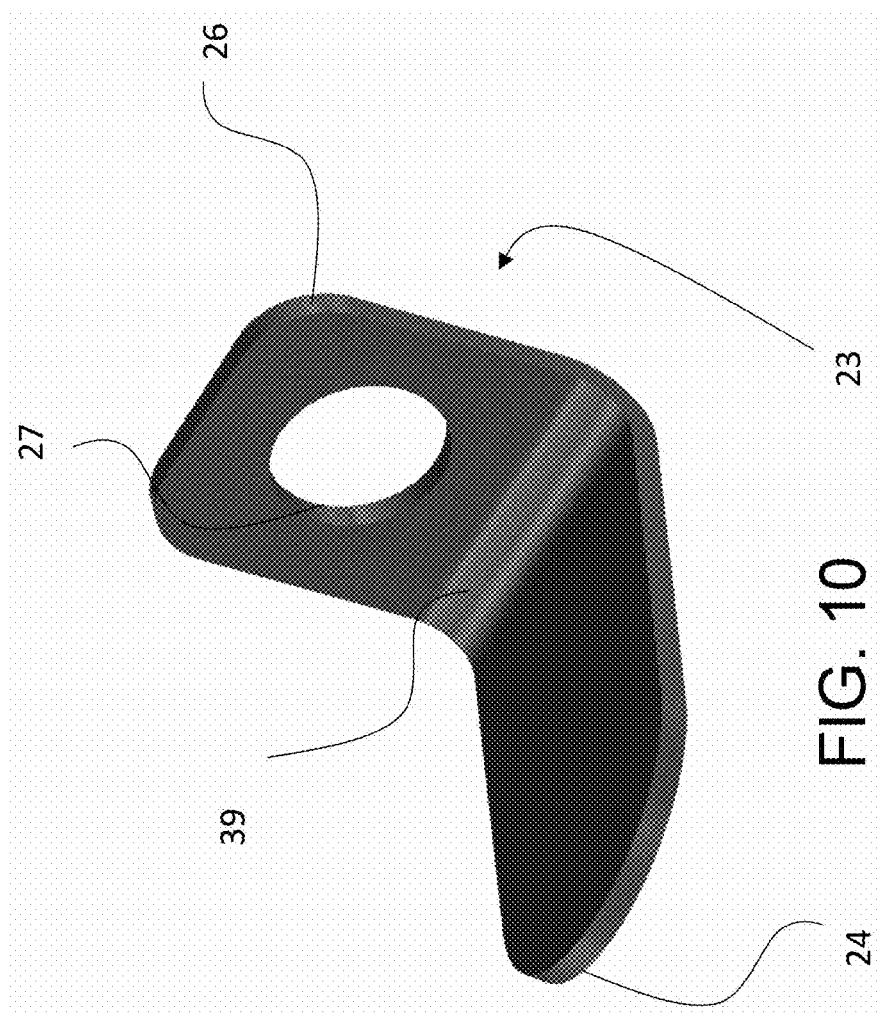

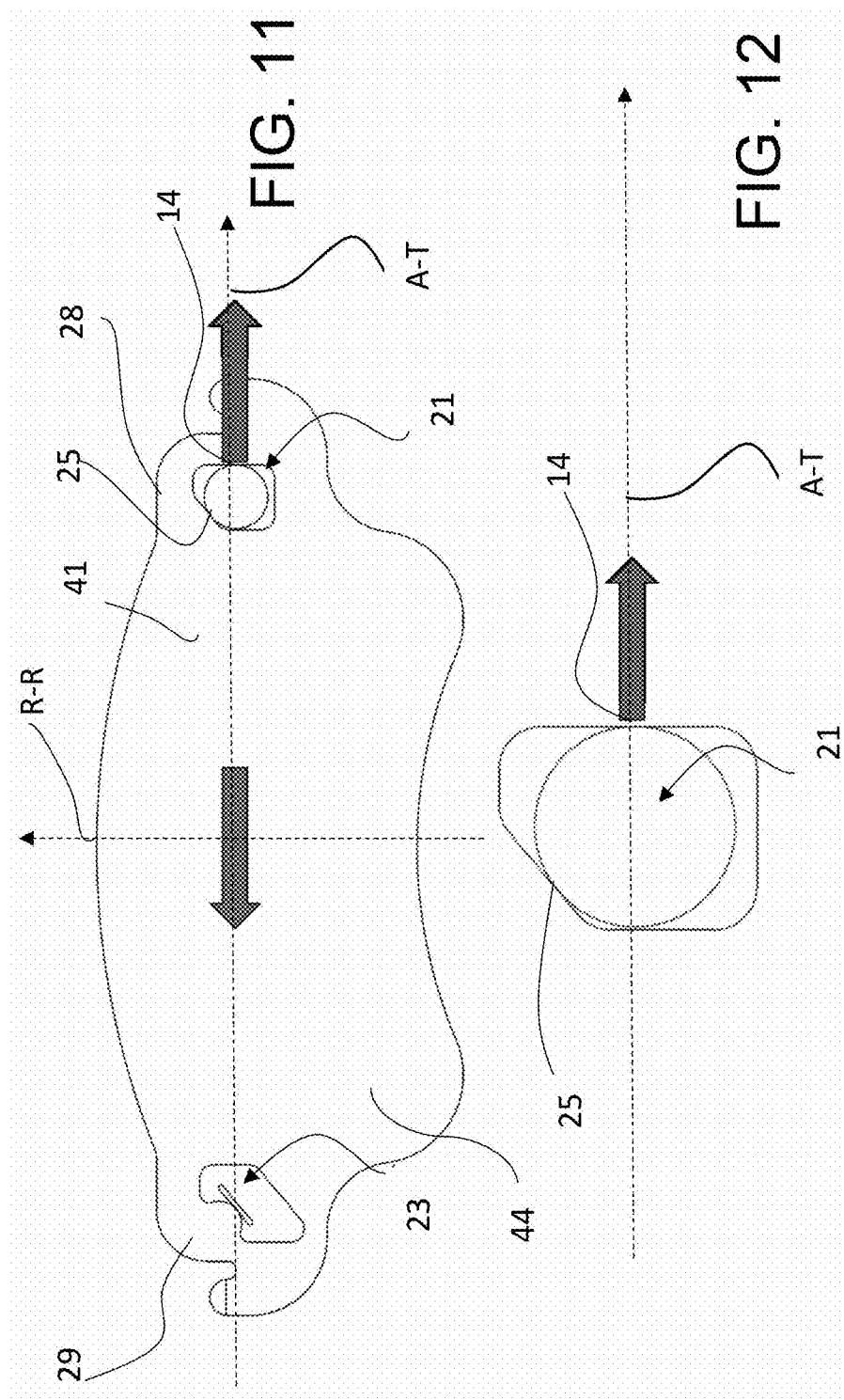

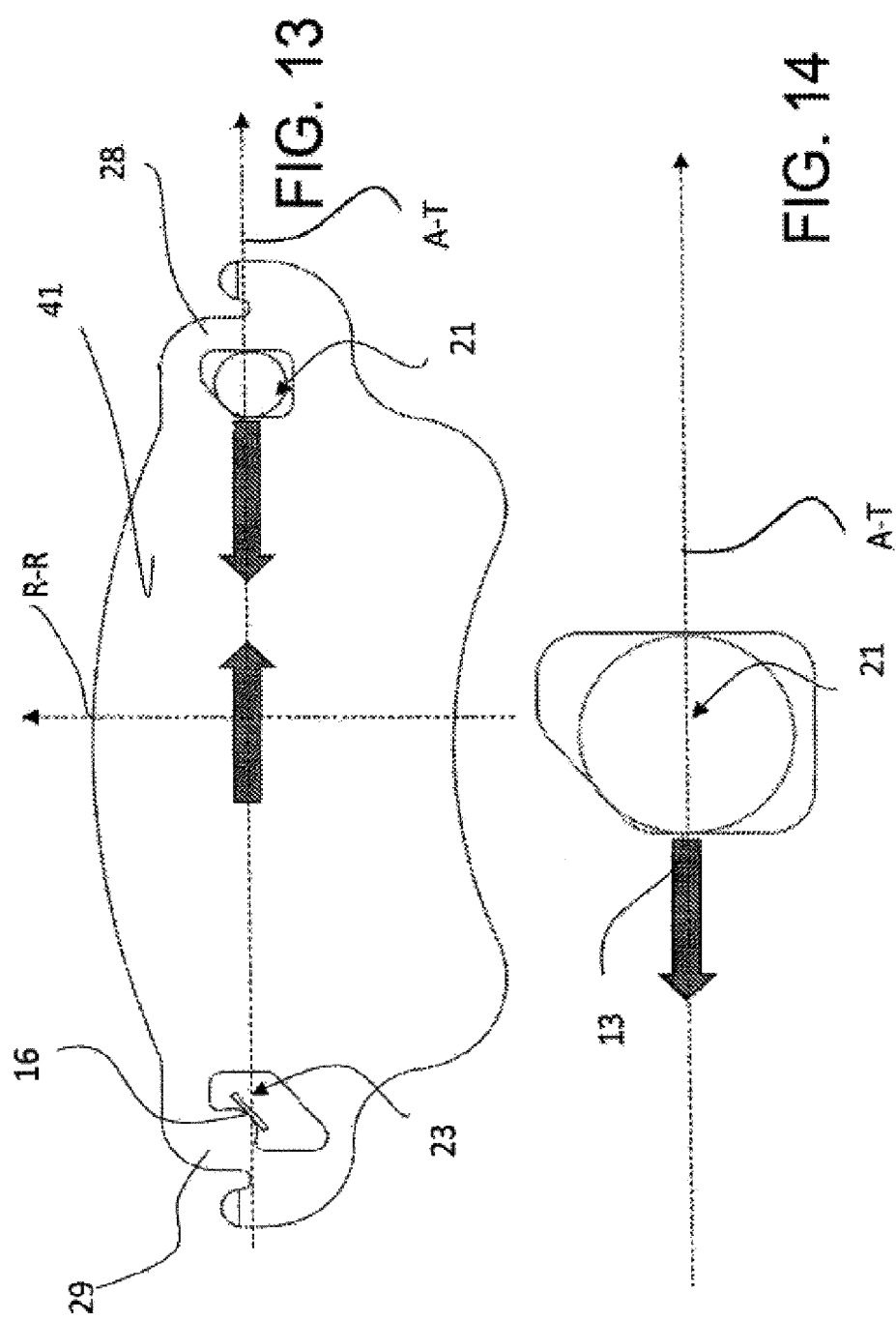

BRAKE PAD; PAD ASSEMBLY; BRAKE CALIPER ASSEMBLY

FIELD

The object of the present invention is a brake pad for a brake caliper, and also a pad assembly, as well as a brake caliper assembly.

In particular, the present invention relates to a pad adapted to be mounted with clearance on a pin provided in the brake caliper, and adapted to be mounted on an elastic support element provided in the brake caliper.

Moreover, the object of the present invention is a pad assembly comprising a pad, a pin and an elastic support element, as well as a brake caliper comprising said assembly.

BACKGROUND

In a disc brake, an axial direction is defined about which a brake disc rotates, a radial direction is defined, substantially orthogonal to said axial direction, and a tangential or circumferential direction is defined, orthogonal both to said axial direction and to said radial direction, substantially forming a system of cylindrical coordinates.

Known brake calipers are generally equipped with pads adapted to engage a braking band of the brake disc associable with the brake caliper to cause the slowing of the vehicle on which the brake caliper is installed. The pads may be supported by pins, connected to the brake caliper body, and can therefore comprise eyelets, into which the pins are inserted with clearance, so as to enable to pads to slide along them, when subjected to the action of relevant thrust means. Moreover, usually such brake calipers comprise at least one pad spring which acts between the caliper body and the pad so that the pad is always in contact with the pins under braking release conditions.

According to a known type of pads, the pins also have the function of transmitting the braking force to the brake caliper itself, rather than enabling the pad to abut with a flank thereof on the brake caliper body to discharge such braking action.

The plate of such a type of pads comprises a pair of lateral ears which extend laterally in the tangential direction, in which the eyelets are made intended for accommodating the pins. Usually said lateral ears are made on a radially internal or radially external portion of the plate.

The eyelets usually have a polygonal shape with rounded or beveled corners. The pins that support the pads instead usually have a circular section cylindrical shape. The distance and size of the eyelets and pins are chosen so that, during the braking action, the pad is placed in traction and transmits the braking force to the pin located on the inlet side of the brake disc, in the space between the pads, whereas the pin arranged on the outlet side of the disc creates a radial support.

Some kinds of pads of this type and the respective pins are known, for example, from documents EP2318729 and EP2746612 to the same Applicant.

By implementing such types of known pads, it was found that the restraint and load conditions of the pad not only allow the braking force to be generated between pad and disc during the braking action, but also a disconnection to be avoided between pin and pad in braking release step, therefore avoiding knocking phenomena in radial direction.

However, it was found that the restraint and load conditions of such types of known pads promote the occurrence of the typical phenomena of squeaking brakes during the braking action.

Furthermore, it was found that the brake pad may take on a plurality of resting configurations in which the pad is resting on the pins once the braking action is released. Accordingly, the movements and accelerations of the pad and the related impacts or knocks of the pad against the pins are of an intensity which depends on the resting configuration in which the pad is in with respect to the pins at the end of the previous braking action, making difficult the implementation of targeted countermeasures limiting to the greatest extent possible the diffusion of vibrations which may excite frequencies of the braking system which may contribute to triggering typical phenomena of generating squeaking during the braking action. Therefore, the need has emerged to provide brake pads which have less of a tendency, if not no tendency, to generate squeaks during the braking action.

Furthermore, the need is strongly felt to build a pad, and pad and pin assemblies, which allow contact points to be obtained between the caliper body and brake pad which are safe and easily repeatable each time the pad is in a resting position so as to reduce, if not eliminate, the knocking phenomena and reduce the noises generated by the pads once the braking action is released, with respect to the prior art.

Therefore, the problem underlying the present invention is to devise a brake pad, a pad assembly and restraint and load elements, and also a brake caliper, which have structural and functional features such to satisfy the aforementioned requirements and, at the same time, solve the drawbacks mentioned with reference to the prior art and satisfy the aforesaid felt needs.

SUMMARY

The object of the present invention is to provide a brake pad, and also a pad assembly, as well as a brake caliper.

This and other objects and advantages are achieved by a brake pad, and also a pad assembly, as well as a brake caliper assembly according to the claims.

Some advantageous embodiments are the object of the dependent claims.

From the analysis of this solution, it has emerged that during the braking action between pad and brake disc, a reduction in or elimination of the radial reaction force of one of the two pins counterbalancing the braking action between pad and brake disc in radial direction is directly associable with a reduction in the tendency of the occurrence of the squeaking phenomena causing bothersome and unwanted noises for the driver and for those in the vicinity of the braking vehicle.

From the analysis of this solution, it has emerged how with a tangential alignment of the first slot adapted to accommodate the first pin with the center of gravity of the braking surface of the brake pad, it is possible to reduce the occurrence of vibrational frequencies which activate squeaking phenomena.

Furthermore, the solutions proposed allow a reaction force Ft to be obtained on the pad aligned with the braking force applied in the center of gravity in tangential direction.

Again furthermore, by virtue of the solutions proposed, the tendency for the creation of a radial reaction force Fr required to ensure the balance under stationary conditions of the pad when the braking force is applied, may be reduced or eliminated.

Again furthermore, by virtue of the solutions proposed, a brake pad may be provided which is capable of always returning to the same balanced position when the braking force is released.

DESCRIPTION OF THE DRAWINGS

Further features and advantages of the pad and pin assembly, the pad and the brake caliper will be apparent from the following description of its preferred embodiments, given by way of non-limiting examples, with reference to the accompanying drawings, in which:

FIG. 8 shows an axonometric view of a detail of the second slot and of the elastic support element of the pad assembly in FIG. 5;

FIG. 9 shows a detail, in side orthogonal view with respect to what is shown in FIG. 7, of the second slot and of the elastic support element of the pad assembly in FIG. 5;

FIG. 10 is an axonometric view of the elastic support element of the pad assembly according to the present invention;

FIG. 11 diagrammatically shows the balance condition of the forces applied to the pad assembly in FIG. 5, under a forward braking condition;

FIG. 12 shows a side view of a detail in FIG. 11, in which there are shown the contact points between a first pin and the first slot of the pad under a forward braking condition;

FIG. 13 diagrammatically shows the balance condition of the forces applied to the pad assembly in FIG. 5, under a reverse braking condition;

FIG. 14 shows a side view of a detail in FIG. 11, showing the contact between the first pin and the first slot of the pad under a reverse braking condition;

DETAILED DESCRIPTION

Figure 1:
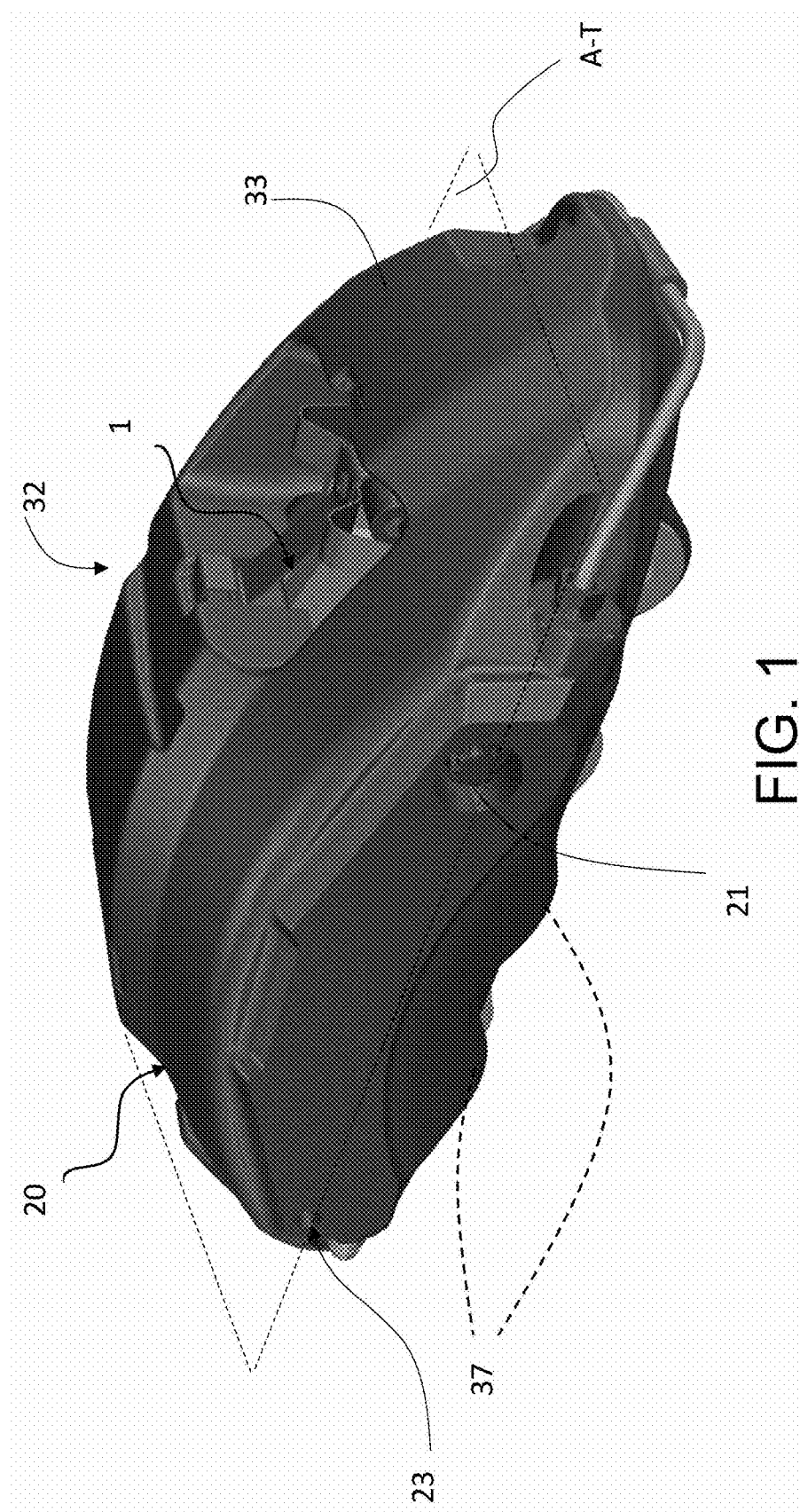
FIG. 1 shows an axonometric view of a brake caliper comprising a brake pad according to the present invention.
Figure 2:
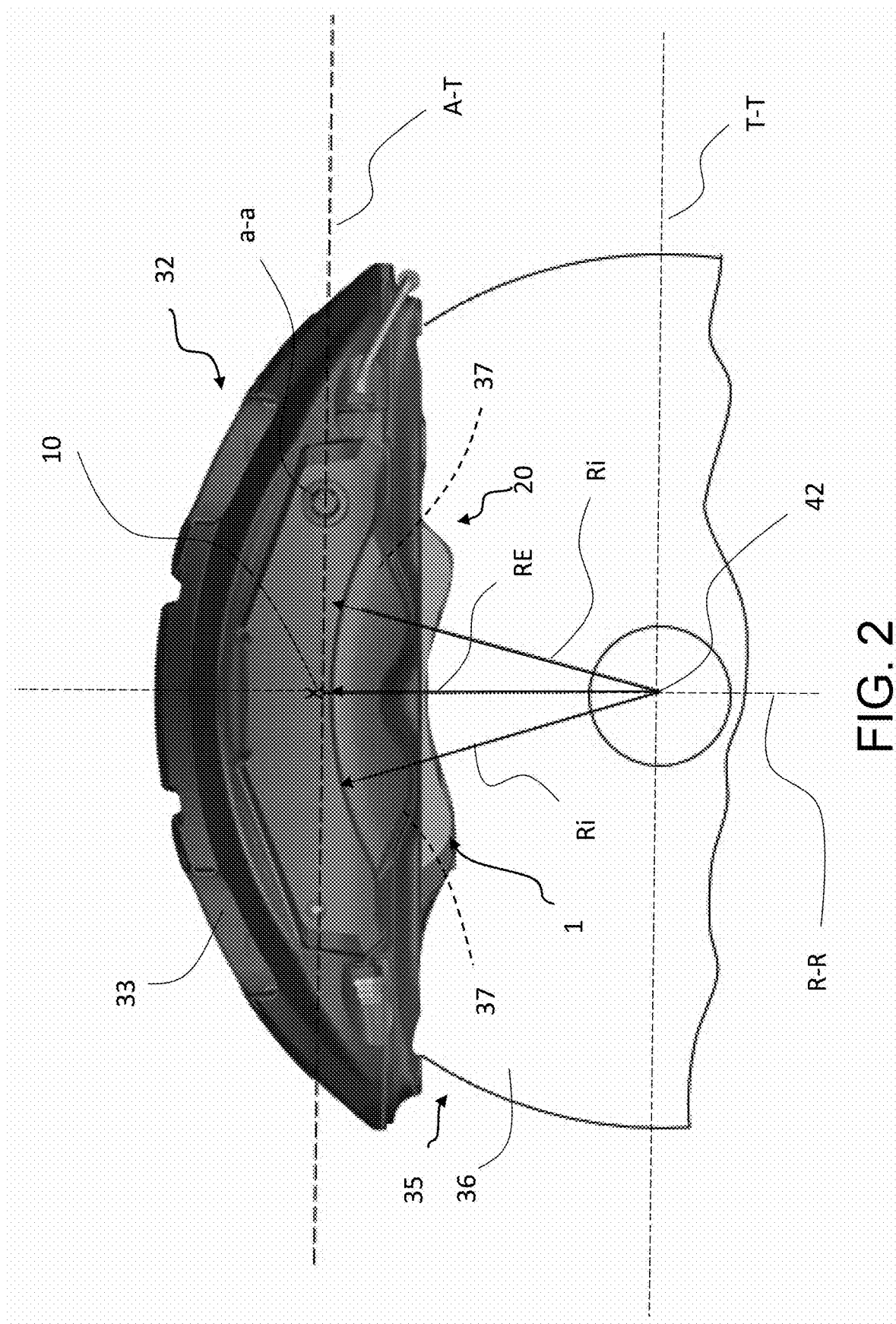
FIG. 2 shows a side view of the brake caliper in FIG. 1, associated with a brake disc.
Figure 3:
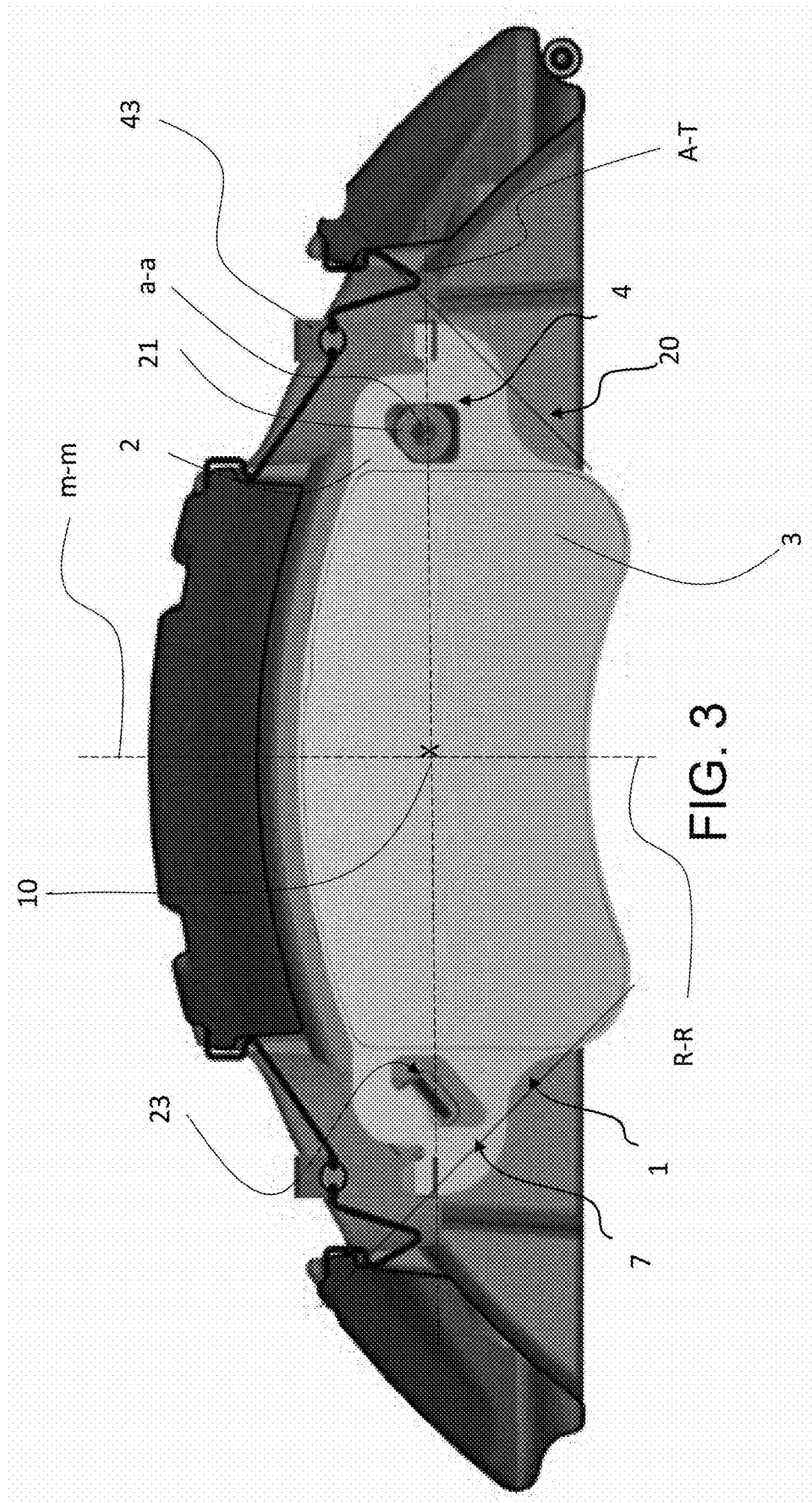
FIG. 3 shows a side view of the brake caliper in FIG. 2, partially sectioned to show the brake pad, and also the pad assembly according to the present invention.
Figure 4:
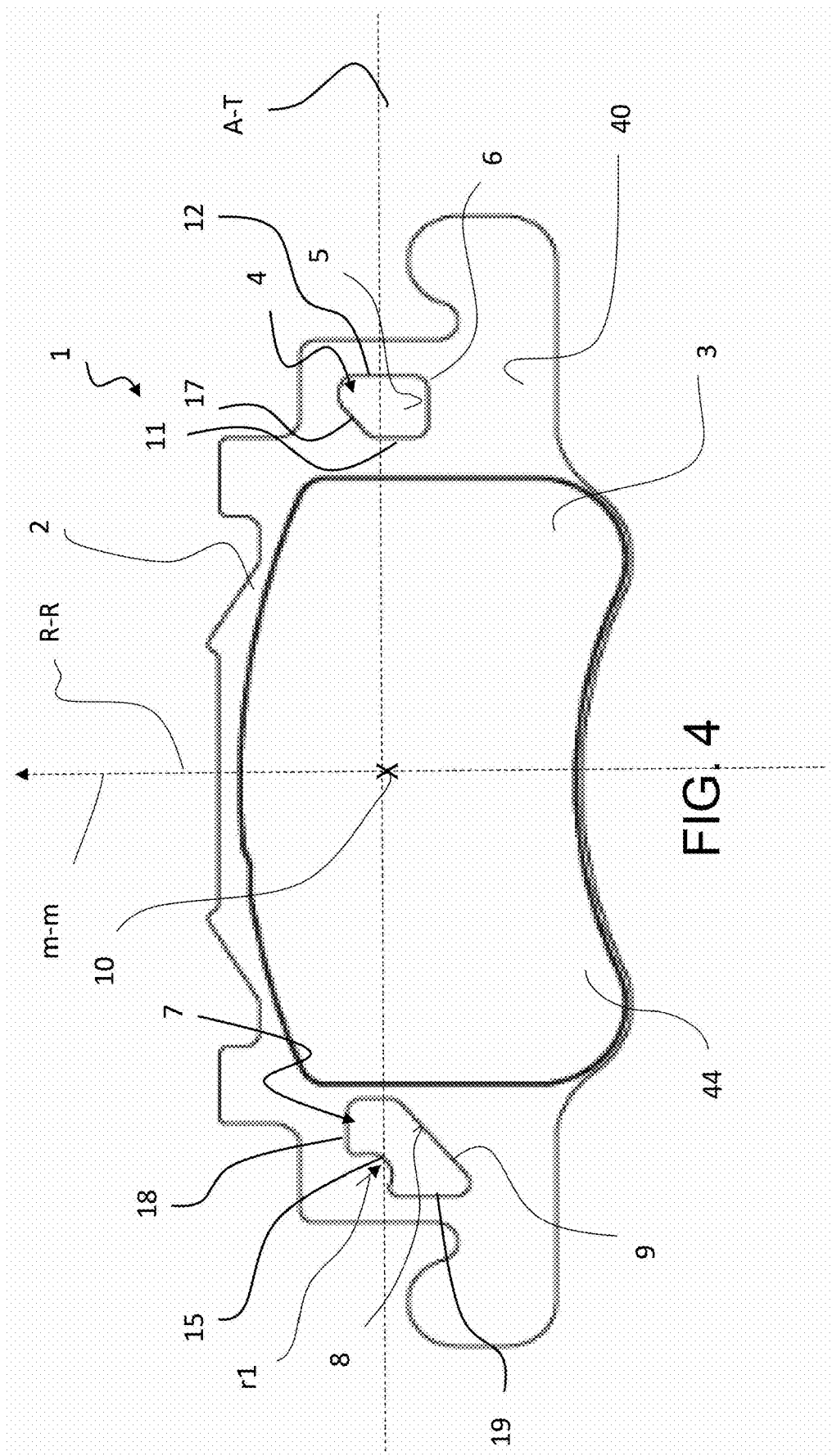
FIG. 4 shows a side view of a brake pad according to the present invention.
Figure 5:
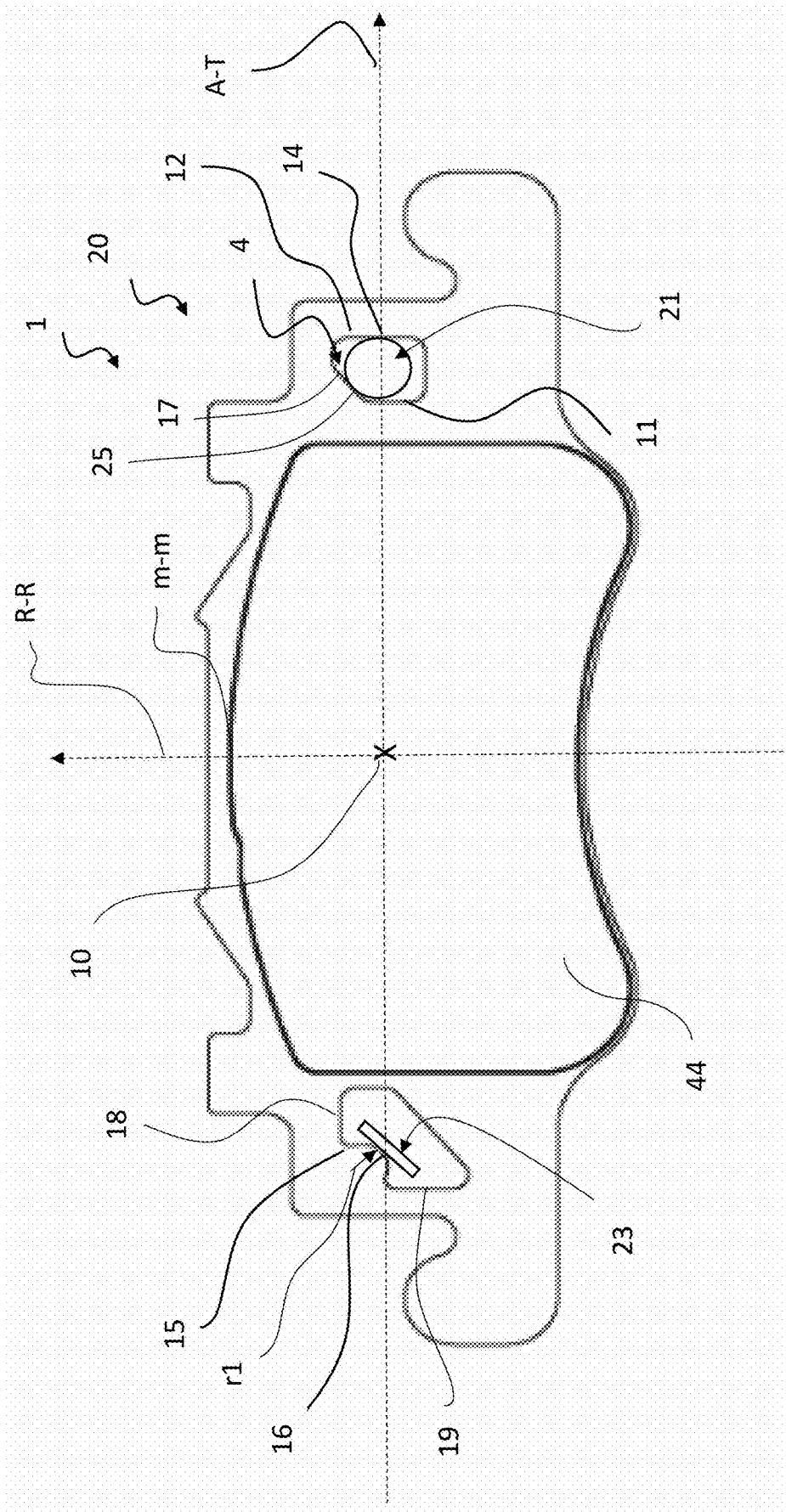
FIG. 5 shows a side view of a pad assembly according to the present invention.
Figure 6:
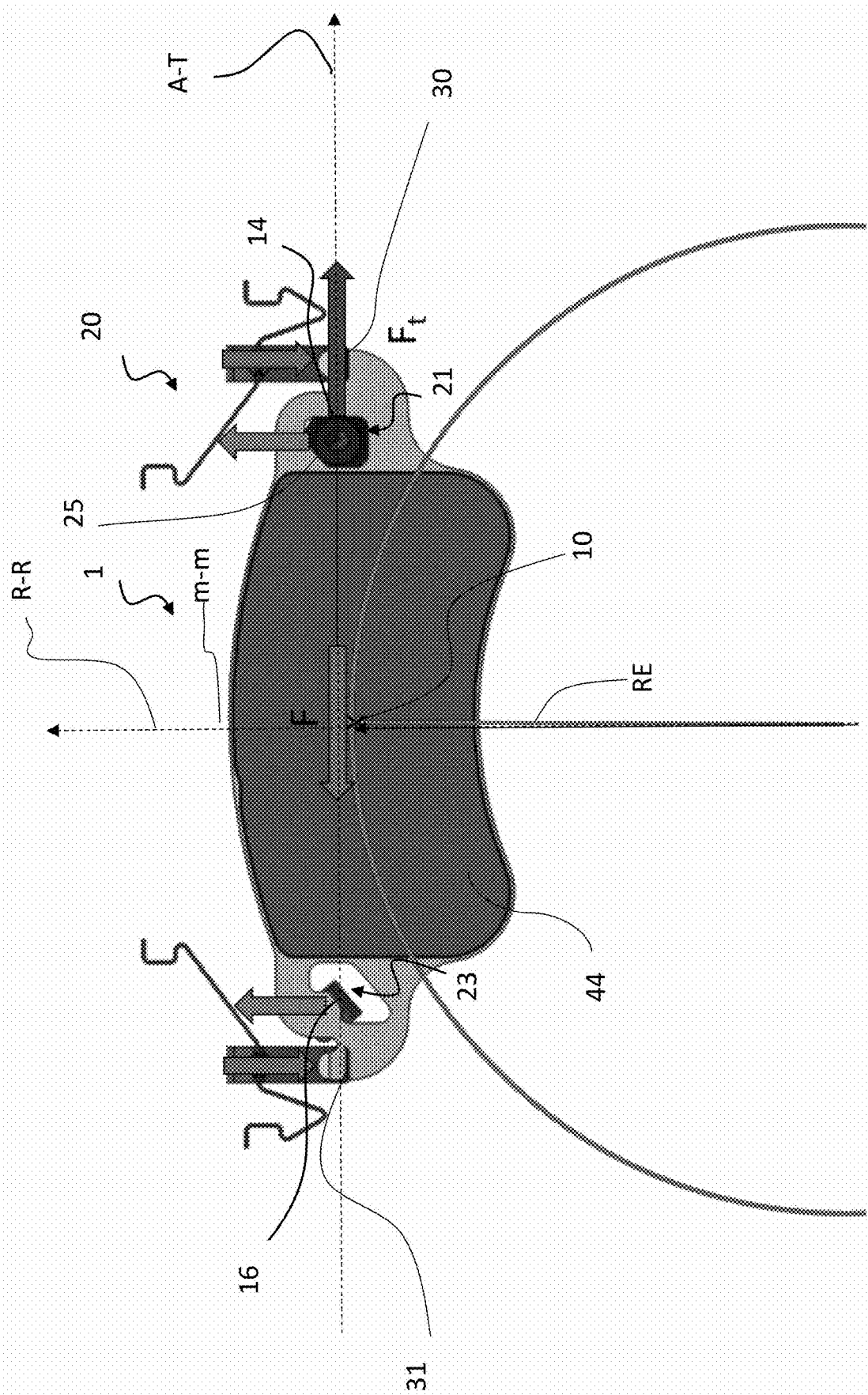
FIG. 6 diagrammatically shows a side view of a braking force applied in the center of gravity of the brake pad and the reaction forces of the brake pad under stationary forward braking conditions.
Figure 7:
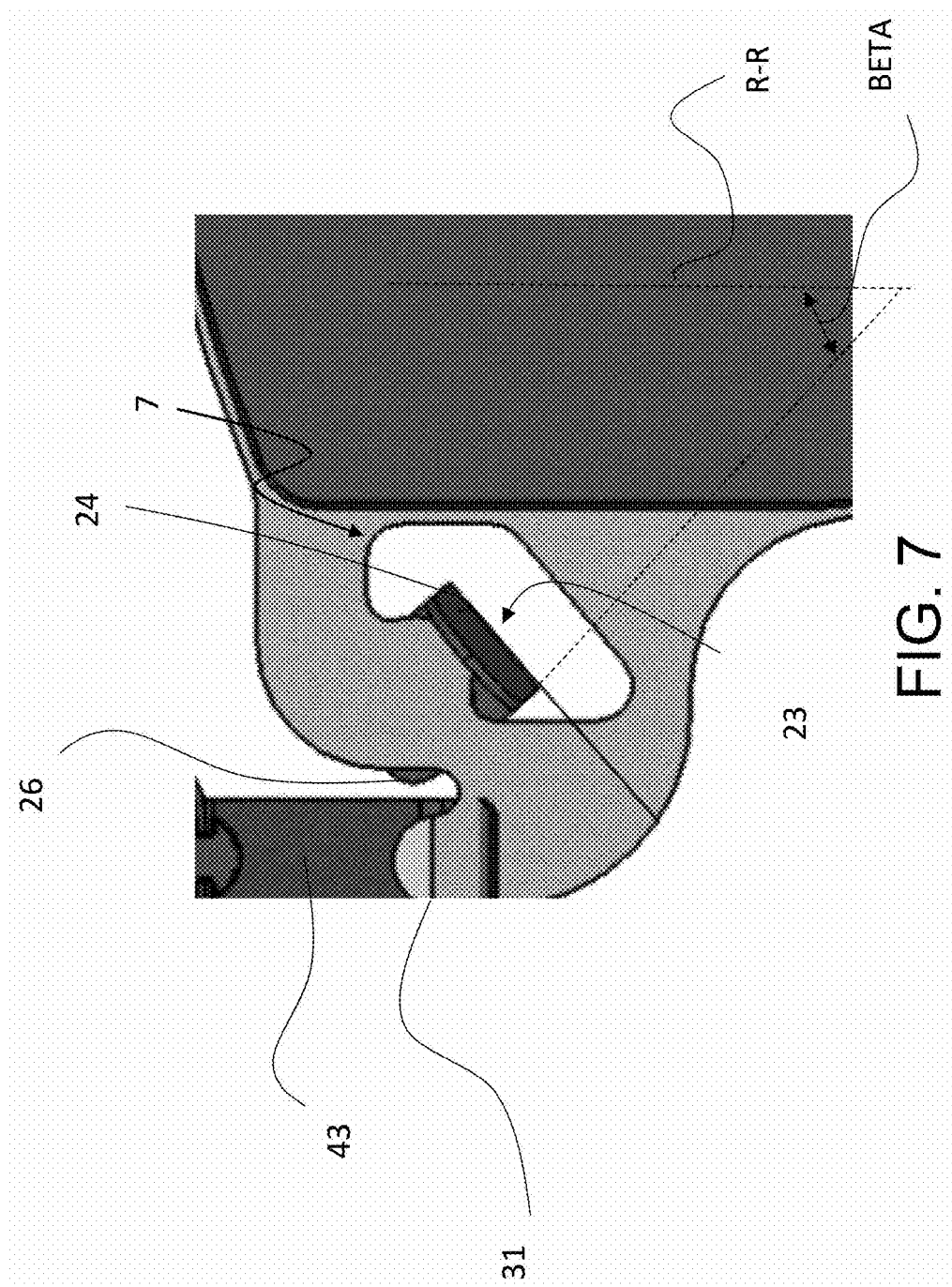
FIG. 7 shows a side view of a detail of the second slot and of the elastic support element of the pad assembly in FIG. 5.
Figure 15:
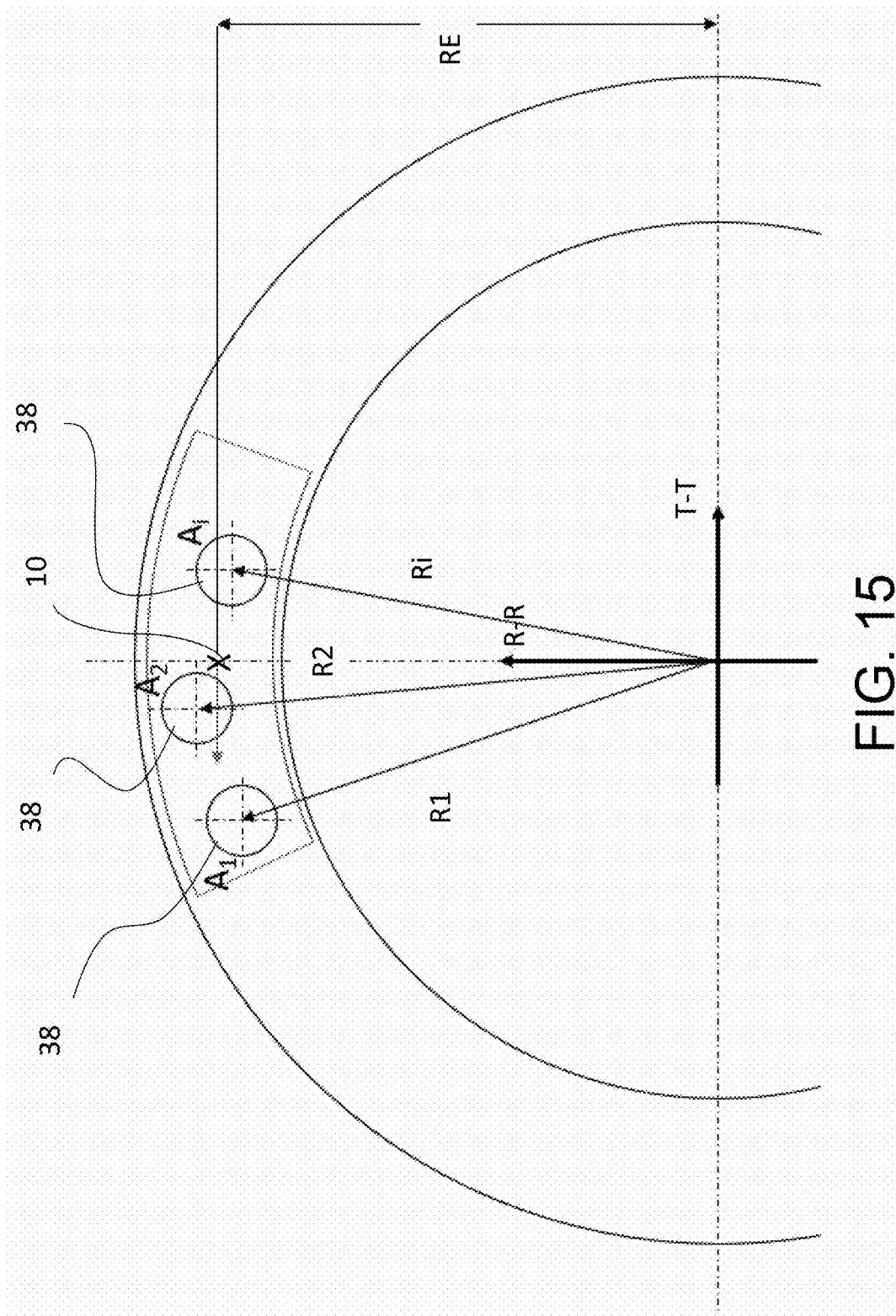
FIG. 15 diagrammatically shows a brake pad and a brake disc, showing the center of gravity of the pad and the thrust center of the brake caliper centered on said center of gravity.

According to a general embodiment, a brake pad 1 for a brake caliper 32 is provided, in which said brake caliper 32 comprises a caliper body 33 adapted to be arranged straddling a brake disc 35.

Said brake pad 1 defines an axial direction A-A, either coinciding with or parallel to the rotation axis of the brake disc 35, a radial direction R-R, orthogonal to the axial direction A-A, and a tangential direction or a circumferential direction T-T, locally orthogonal to both the axial direction A-A and the radial direction R-R.

Said brake pad 1 comprises at least one plate 2 and at least one friction material 3 supported by said plate 2.

Said friction material 3 comprises a friction material surface 44 adapted to abut against a braking band 36 of the brake disc 35.

Said friction material surface 44 has a center of gravity 10.

According to an embodiment, said brake pad 1 has a centerline axis m-m coinciding with said radial direction R-R which divides said friction material 3 in half with respect to said tangential direction T-T.

According to an embodiment, said plate 2 comprises a first plate surface 40 facing the braking band 36 and a second plate surface 41 facing on an opposite side.

Said plate 2 has a main extension along the radial direction R-R and the tangential direction T-T and has a plate thickness along the axial direction A-A.

Said plate 2 is provided with a first slot 4 passing through the plate thickness.

Said first slot 4 comprises a first slot edge 5 adapted to accommodate with clearance a first pin 21 mounted to the caliper body 33.

Said first slot edge 5 comprises a tangentially inner portion of first slot or first portion 11 of first slot, and a tangentially outer portion of first slot or second portion 12 of first slot.

Said brake pad 1 has a tangential center-of-gravity plane A-T parallel to the tangential direction T-T passing through said center of gravity 10 and orthogonal to the radial direction R, R passing through said center of gravity 10.

Advantageously, said first portion 11 of first slot and said second portion 12 of first slot are crossed by said tangential center-of-gravity plane A-T.

Thereby, under a reverse braking condition, said brake pad 1 rests against said first pin 21 in at least a first contact point 13 of first slot arranged on said first portion 11 of first slot, and under a forward braking condition, said brake pad 1 rests against said first pin 21 in at least a second contact point 14 of first slot arranged on said second portion 12 of first slot.

Advantageously, said second contact point 14 of first slot lies in said tangential center-of-gravity plane A-T.

According to an embodiment, said first contact point 13 of first slot lies in said tangential center-of-gravity plane A-T.

According to an embodiment, said center of gravity 10 is localized with respect to said rotation axis of the brake disc, along said centerline axis m-m, at a radial center of $$T_E = 0$$

$$R_E = \frac{\sum_{i=1}^{n} R_i A_i}{\sum_{i=1}^{n} A_i}$$

gravity distance Re defined as a distance from the rotation axis of the brake disc 35 equal to the ratio of a sum of the product, for each thrust device 37, of a thrust area Ai times a respective radial distance Ri of thrust device from the rotation axis of the brake disc 35, and a sum of the thrust area Ai of each thrust device 37, that is according to the formula where TE is the tangential coordinate, aligned with said centerline axis m-m, and RE is the distance between the rotation axis of the brake disc and the center of gravity of the brake pad along the radial direction R-R parallel to the centerline axis m-m.

According to an embodiment, said first pin 21 comprises a pin diameter Dp. According to an embodiment, said pin diameter Dp is between 5 mm and 20 mm. According to an embodiment, said first pin is cylindrical.

According to an embodiment, said center of gravity 10 is localized along said centerline axis m-m in the center of the area of the friction material surface 44.

According to an embodiment, said first portion 11 of first slot and said second contact portion 12 of first slot are orthogonal to said tangential center-of-gravity plane A-T.

According to an embodiment, said first slot edge 5 defines a first slot profile 6, in which said first slot profile 6 forms a closed profile.

By virtue of the provision of the first slot 4 comprising said first portion 11 of first slot and said second portion 12 of first slot which are aligned with the center of gravity 10, it is possible to use only the first pin 21 to discharge the braking force centered in the center of gravity 10 and oriented in tangential direction onto the caliper body 33, thus minimizing the radial reactions to the braking force. Accordingly, the vibrations induced by possible radial components of the force of reaction of the pad to the braking force are significantly reduced, avoiding inducing resonance frequencies which could cause squeaks and noise in the pad and/or in the caliper body.

According to an embodiment, said plate 2 is provided with a second slot 7 passing through the plate thickness.

According to an embodiment, said second slot 7 comprises a second slot edge 8 adapted to accommodate an elastic support element 23 mounted on the caliper body 33.

According to an embodiment, said elastic support element 23 is adapted to support said brake pad 1 without transmitting the braking force to the caliper body 33.

According to an embodiment, said second slot edge 8 comprises a radially outer portion of second slot or first portion 15 of second slot.

Thereby, said brake pad 1 rests against said elastic support element 23 in at least a first contact point 16 of second slot arranged on said first portion 15 of second slot under said reverse braking condition, under said forward braking condition and under a braking release condition.

By virtue of the provision of the second slot 7 adapted to accommodate the elastic support element 23, the pad may be supported in radial direction R-R under braking release conditions and possible rotations of the brake pad 1 may be prevented under braking conditions.

According to an embodiment, said first portion 15 of second slot is crossed by said tangential center-of-gravity plane A-T.

According to an embodiment, said first portion 15 of second slot is aligned with or lies in said tangential center-of-gravity plane A-T.

According to an embodiment, said first contact point 16 of second slot lies in said tangential center-of-gravity plane A-T.

According to an embodiment, said first contact point 12 of first slot, said second contact point 13 of first slot and said first contact point 16 of second slot are coplanar.

According to an embodiment, said first portion 15 of second slot is a flat portion.

According to an embodiment, said second slot edge 8 defines a second slot profile 9. According to an embodiment, said second slot profile 9 forms a closed profile.

According to an embodiment, said second slot profile 9 is rectangular or square in shape. According to an embodiment, said second slot profile 9 comprises beveled joining portions.

According to an embodiment, said plate 2 comprises a first lateral ear 28 and a second lateral ear 29. According to an embodiment, said first slot 4 is made in said first lateral ear 28. According to an embodiment, said second slot 7 is made in said second lateral ear 29.

According to an embodiment, said first portion 15 of second slot is a curved portion. According to an embodiment, said first portion 15 of second slot has a curvature radius of first portion of second slot or second slot curvature radius Ro. According to an embodiment, said first portion 15 of second slot is convex and protrudes towards the interior of said second slot 7.

According to an embodiment, said second slot edge 8 comprises a further radially outer portion of second slot or second portion 18 of second slot. According to an embodiment, said second portion 18 of second slot is a flat portion. According to an embodiment, said second portion 18 of second slot is transverse or orthogonal to a direction parallel to said radial direction R-R.

According to an embodiment, said second slot edge 8 comprises a tangentially outer portion of second slot or third portion 19 of second slot. According to an embodiment, said third portion 19 of second slot is a flat portion. According to an embodiment, said third portion 19 of second slot is parallel to said radial direction R-R.

According to an embodiment, said second portion 18 of second slot and said third portion 19 of second slot are mutually convergent.

According to an embodiment, said first portion 15 of second slot joins said second portion 18 of second slot and said third portion 19 of second slot. Thereby, said first portion 15 of second slot is placed in a tangentially outer and radially external position with respect to the brake disc. According to an embodiment, said elastic element 23 contacts said pad in said first contact point 16 of second slot which is arranged in a tangentially outer and radially external position with respect to the brake disc. Thereby, not only may said brake pad 1 be elastically biased in radial direction R-R, but also in tangential direction T-T.

According to an embodiment, said first slot edge 5 comprises a radially outer portion of first slot or third portion 17 of first slot.

According to an embodiment, said third portion 17 of first slot is arranged in a radial outer direction R-R with respect to said thrust center tangential plane A-T, with respect to the brake disc 35.

According to an embodiment, said brake pad 1 rests against said first pin 21 in at least a third contact point 25 of first slot arranged on said third portion 17 of first slot at least under a braking release condition.

According to an embodiment, said third portion 17 of first slot and said second portion 12 of first slot are mutually convergent. According to an embodiment, said third portion 17 of first slot and said second portion 12 of first slot are opposite to each other with respect to said tangential direction T-T. According to an embodiment, under said braking release conditions, said brake pad 1 simultaneously rests against said first pin 21 in at least said second contact point 14 of first slot and said third contact point 25 of first slot.

According to an embodiment, said third portion 17 of first slot and said second portion 12 of first slot form a wedge portion of said first slot 4 which allows said brake pad 1 to abut against said first pin 21 always in the same position under braking release conditions by virtue of the thrust in radial direction R-R of a pad spring 43 connected to the caliper body 33.

The present invention also relates to a pad assembly 20. Said assembly 20 comprises at least one brake pad 1 according to at least one of the embodiments described above.

According to an embodiment, said assembly 20 comprises a first pin 21 adapted to be slidingly accommodated in said first slot profile 6. According to an embodiment, said first pin 21 is adapted to contact said first slot profile 6 and to discharge a braking force onto the caliper body 33. According to an embodiment, said first pin 21 comprises a pin axis a-a parallel to said axial direction A-A.

According to an embodiment, in said forward braking configuration, said first pin 21 contacts said brake pad 1 at least in said second contact point 14 of first slot. According to an embodiment, under said reverse braking condition, said first pin 21 contacts said brake pad 1 at least in said first contact point 13 of first slot. According to an embodiment, said pin axis a-a lies in said tangential center-of-gravity plane A-T.

According to an embodiment, said assembly 20 comprises an elastic support element 23, as described above.

According to an embodiment, said elastic support element 23 is adapted to contact said second slot profile 9. According to an embodiment, an elastic support element 23 is adapted to support said brake pad 1 in a radial direction R-R and either to limit or prevent a rotation of said brake pad 1 under a braking release condition by avoiding the transmission of a force to said brake pad 1 under said forward braking condition and said reverse braking condition.

According to an embodiment, said elastic support element 23 contacts said brake pad 1 in at least said first contact point 16 of second slot under said reverse braking condition, under said forward braking condition, and under said braking release condition.

According to an embodiment, said elastic support element 23 comprises an elastic arm 24. According to an embodiment, said elastic arm 24 is elastically movable with respect to said caliper body 33, between a resting position and at least one biased position.

According to an embodiment, said elastic support element 23 comprises an anchor portion 26 configured to be directly connected to the caliper body 33 or indirectly to a second pin 22 connected to the caliper body 33. According to an embodiment, said elastic arm 24 is configured to contact said first portion 15 of second slot in at least said first contact point 16 of second slot. According to an embodiment, said elastic arm 24 is elastically movable with respect to said anchor portion 26, between a resting position and at least one biased position.

According to an embodiment, said elastic support element 23 is L-shaped. According to an embodiment, said elastic support element 23 is a leaf spring.

According to an embodiment, said elastic arm 24 is joined to said anchor portion 26.

According to an embodiment, said elastic arm 24 and said anchor portion 26 mutually form, or the extensions thereof mutually form, an elastic element angle ALPHA. According to an embodiment, said elastic element angle ALPHA is between 90 degrees and 60 degrees. According to an embodiment, said elastic element angle ALPHA is between 85 degrees and 75 degrees. Thereby, said elastic support element 23 supports said brake pad 1 in radial direction R-R and acts on said brake pad 1 also in axial direction A-A.

A substantially punctiform contact may be achieved between said pad and said elastic support element 23 by virtue of the provision of the first curved portion 15 of second slot and the elastic element angle ALPHA, thus minimizing the biases and vibrations between said pad and said elastic support element.

According to an embodiment, said anchor portion 26 is inclined with respect to said radial direction R-R by an elastic element inclination angle BETA. According to an embodiment, said elastic element inclination angle BETA is between 30 degrees and 60 degrees so as to constantly bias said pad in the tangential direction T-T and the radial direction R-R.

According to an embodiment, said elastic support element 23 is preloaded in tangential direction T-T so as to constantly affect said pad in tangential direction T-T so as to bias said first slot 4 on said first pin 21 in said second contact point 14 of first slot.

By virtue of the provision of the elastic element inclination angle BETA and of the wedge-shaped portion of first slot, the brake pad 1 is able to always return to the same position at the release of the braking action, resting on said first pin 21 at least in the second contact point of first slot and in the third contact point of first slot.

According to an embodiment, said assembly 20 comprises a second pin 22 adapted to be connected to said caliper body 33 and adapted to support said elastic support element 23.

According to an embodiment, said assembly 20 comprises a pad spring 43 adapted to be connected to the caliper body 33 and to the brake pad 1. According to an embodiment, said plate 2 comprises a first pad spring seat 30 adapted to accommodate at least a portion of said pad spring 43. According to an embodiment, said plate 2 comprises a second pad spring seat adapted to accommodate at least a portion of said pad spring 43.

The present invention also relates to a brake caliper assembly comprising a brake caliper 32 for a disc brake 34 of a vehicle. Said brake caliper 32 comprises a caliper body 33 adapted to be arranged straddling a brake disc 35 defining an axial direction A-A coinciding with or parallel to the rotation axis of the brake disc 35, a radial direction R-R, orthogonal to the axial direction A-A, and a tangential or circumferential direction T-T, orthogonal to both the axial direction A-A and the radial direction R-R. Said brake caliper 32 comprises at least one thrust device 37 having a respective thrust area Ai and a thrust device center arranged at a radial distance Ri of thrust device. According to an embodiment, said brake caliper 32 comprises two thrust devices 37 or three thrust devices 37.

According to an embodiment, said brake caliper assembly comprises at least one assembly 20 connected to said caliper body, according to at least one of the embodiments described above.

According to an embodiment, said brake caliper assembly comprises at least one brake pad 1 and a first pin 21, which are connected to the caliper body, according to at least one of the embodiments described above.

According to an embodiment, said first pin 21 is connected to the caliper body 33 and adapted to protrude in a cantilever manner from said caliper body 33 towards the braking band 36 of the brake disc 35.

According to an embodiment, said brake caliper assembly comprises at least one elastic support element 23 connected to said caliper body, according to at least one of the embodiments described above.

Said elastic support element 23 is connected to the caliper body 33 and adapted to protrude in a cantilever manner from said caliper body 33 towards the braking band 36 of the brake disc 35.

According to an embodiment, said brake caliper 32 has a thrust center centered on said center of gravity 10. According to an embodiment, said center of gravity 10 is localized at a radial center of gravity distance Re with respect to the rotation axis of the disc according to the formula described above.

LIST OF REFERENCES

1 brake pad
2 plate
3 friction material
4 first slot
5 first slot edge
6 first slot profile
7 second slot
8 second slot edge
9 second slot profile
10 center of gravity
11 tangentially inner portion of first slot or first portion of first slot
12 tangentially outer portion of first slot or second portion of first slot
13 first contact point of first slot
14 second contact point of first slot
15 radially outer portion of second slot or first portion of second slot
16 first contact point of second slot
17 radially outer portion of first slot or third portion of first slot
18 further radially outer portion of second slot or second portion of second slot
19 tangentially outer portion of second slot or third portion of second slot
20 pad assembly
21 first pin
22 second pin
23 elastic support element
24 elastic arm
25 third contact point of first slot
26 anchor portion
27 anchor opening
28 first lateral ear
29 second lateral ear
30 first pad spring seat
31 second pad spring seat
32 brake caliper
33 caliper body
34 disc brake
35 brake disc
36 braking band
37 thrust device
38 thrust device thrust area
39 elastic element folding portion
40 first plate surface
41 second plate surface
42 disc axis
43 pad spring
44 friction material surface
a-a first pin axis
m-m centerline axis
Re radial center of gravity distance
Ro second slot curvature radius
Ri thrust device distance
A-A axial direction
T-T circumferential or tangential direction
R-R radial direction
A-T tangential center-of-gravity plane
ALPHA elastic element angle
BETA elastic element inclination angle

The invention claimed is:

1. A brake pad for a brake caliper, wherein said brake caliper comprises a caliper body adapted to be arranged straddling a brake disc,
said brake pad defining an axial direction, either coinciding with or parallel to the rotation axis of the brake disc, a radial direction, orthogonal to the axial direction, and a tangential direction or a circumferential direction, orthogonal to both the axial direction and the radial direction;
wherein said brake pad comprises at least one plate and at least one friction material supported by said plate; wherein said friction material comprises a friction material surface adapted to abut against a braking band of the brake disc, wherein said friction material surface has a center of gravity,
wherein said plate has a main extension along the radial direction and the tangential direction and has a plate thickness along the axial direction;
wherein said plate is provided with a first slot passing through the plate thickness,
wherein said first slot comprises a first slot edge adapted to accommodate with clearance a first pin mounted to the caliper body,
wherein said first slot edge comprises a tangentially inner portion of said first slot or first portion of said first slot, and a tangentially outer portion of said first slot or second portion of said first slot,
wherein said brake pad has a tangential center-of-gravity plane parallel to the tangential direction passing through said center of gravity and orthogonal to the radial direction passing through said center of gravity, characterized in that said first portion of said first slot and said second portion of said first slot are crossed by said tangential center-of-gravity plane so that under a reverse braking condition, said brake pad rests against said first pin in at least a first contact point of said first slot arranged on said first portion of said first slot, and under a forward braking condition, said brake pad rests on said first pin in at least a second contact point of said first slot arranged on said second portion of said first slot,
wherein said second contact point of said first slot lies in said tangential center-of-gravity plane.

2. The brake pad according to claim 1,
wherein said first contact point of said first slot lies in said tangential center-of-gravity plane;
and/or
wherein said brake pad has a centerline axis coinciding with said radial direction which divides said friction material in half with respect to said tangential direction, wherein said center of gravity is arranged along said centerline axis.

3. The brake pad according to claim 2,
wherein said plate is provided with a second slot passing through the plate thickness,
wherein said second slot comprises a second slot edge adapted to accommodate an elastic support element mounted to the caliper body, said elastic support element being adapted to support said brake pad without transmitting the braking force to the caliper body, wherein said second slot edge comprises a radially outer portion of second slot or first portion of second slot so that said brake pad rests against said elastic support element in at least a first contact point of second slot arranged on said first portion of second slot under said reverse braking condition, under said forward braking condition, and under a braking release condition, and/or wherein said first slot edge defines a first slot profile, wherein said first slot profile forms a closed profile, and/or wherein said first portion of said first slot and said second contact portion of said first slot are orthogonal to said tangential center-of-gravity plane.

4. The brake pad according to claim 3, wherein said first portion of second slot is a curved portion having a curvature radius of first portion of second slot or second slot curvature radius, wherein said first contact portion of second slot is convex and protrudes towards the interior of said second slot.

5. The brake pad according to claim 4, wherein said second slot edge comprises a further radially outer portion of second slot or second portion of second slot and a tangentially outer portion of second slot or third portion of second slot, wherein said first portion of second slot connects said second portion of second slot and said third portion of second slot so that said first contact point of second slot is arranged in a tangentially outer and radially external position with respect to the brake disc, and/or wherein said second portion of second slot and said third portion of second slot are mutually convergent.

6. The brake pad according to claim 3, wherein said first portion of second slot is crossed by said tangential center-of-gravity plane or is aligned with said tangential center-of-gravity plane, wherein said first contact point of second slot lies in said tangential center-of-gravity plane, and/or wherein said second slot edge defines a second slot profile, wherein said second slot profile forms a closed profile.

7. A pad assembly, comprising at least one brake pad according to claim 1, a first pin adapted to be slidingly accommodated in said first slot profile and contact said first slot profile, wherein said first pin comprises a pin axis parallel to said axial direction, wherein, in said forward braking configuration, said first pin contacts said brake pad at least in said second contact point of said first slot, and wherein, under said reverse braking condition, said first pin contacts said brake pad at least in said first contact point of said first slot.

8. The pad assembly, according to claim 7, further comprising an elastic support element adapted to contact said second slot profile, said elastic support element being adapted to support said brake pad in a radial direction and either to limit or prevent the rotation of said brake pad under a braking release condition by avoiding the transmission of a force to said brake pad under said forward braking condition and said reverse braking condition, wherein said elastic support element, under said reverse braking condition, under said forward braking condition, and under said braking release condition, contacts said brake pad in at least said first contact point of second slot, and/or wherein said pin axis lies in said tangential center-of-gravity plane.

9. The pad assembly according to claim 8, wherein said elastic support element comprises an elastic arm and an anchor portion configured to connect either directly to the caliper body or indirectly to a second pin connected to the caliper body, wherein said elastic arm is configured to contact said first portion of second slot at least in said first contact point of second slot, wherein said elastic arm is elastically movable with respect to said anchor portion, between a resting position and at least one biased position, and/or wherein said elastic support element is L-shaped, and/or wherein said elastic support element is a leaf spring.

10. The pad assembly according to claim 9, wherein said elastic arm is joined to said anchor portion forming, in said resting position, an elastic element angle between 90 degrees and 60 degrees, so that said elastic support element supports said brake pad in the radial direction and also acts on said brake pad in the axial direction;

and/or wherein said anchor portion is inclined with respect to said radial direction by an elastic element inclination angle between 30 degrees and 60 degrees to constantly bias said pad in the tangential direction and the radial direction.

11. The brake pad according to claim 1, wherein said first slot edge comprises a radially outer portion of said first slot or third portion of said first slot, wherein said third portion of said first slot is arranged in a radially outer direction with respect to said tangential center-of-gravity plane so that said brake pad rests against said first pin in at least a third contact point of said first slot arranged on said third portion of said first slot under a braking release condition.

12. The brake pad according to claim 11, wherein said third portion of said first slot and said second portion of said first slot are mutually convergent and opposite to said tangential direction, wherein, under said braking release condition, said brake pad simultaneously rests on said first pin in at least said second contact point of said first slot and said third contact point of said first slot.

13. A brake caliper assembly comprising a brake caliper for a disc brake of a vehicle, said brake caliper comprising a caliper body adapted to be arranged straddling said brake disc, wherein said disc brake comprises a brake disc and defines an axial direction, either coinciding with or parallel to the rotation axis of the brake disc, a radial direction, orthogonal to the axial direction, and a tangential or circumferential direction, accurately orthogonal to both the axial direction and the radial direction, said brake caliper assembly comprising:

at least one assembly, or at least one brake pad, according to claim 1, and at least a first pin, connected to said brake caliper at wherein said first pin is connected to the caliper body and adapted to protrude in a cantilever manner from said caliper body towards the braking band of the brake disc.

14. The brake caliper assembly according claim 13, wherein said brake caliper comprises at least one thrust device having a respective thrust area and a thrust device center arranged at a radial distance of thrust device with respect to said brake disc rotation axis, wherein said brake caliper has a thrust center centered on said center of gravity; and/or wherein said center of gravity is arranged with respect to said rotation axis of said brake disc at a radial distance of center of gravity, wherein said radial distance of center of gravity is equal to the ratio of a sum of the product of the thrust area by the respective thrust device distance of each thrust device, with a sum of the thrust area of each thrust device, according to the formula $$T_E = 0$$
$$R_E = \frac{\sum_{i=1}^{n} R_i A_i}{\sum_{i=1}^{n} A_i}.$$

\* \* \* \* \*